May 25, 1948. C. C. UTZ 2,442,252
MOTOR VEHICLE STABILIZING MEANS
Filed Sept. 17, 1942
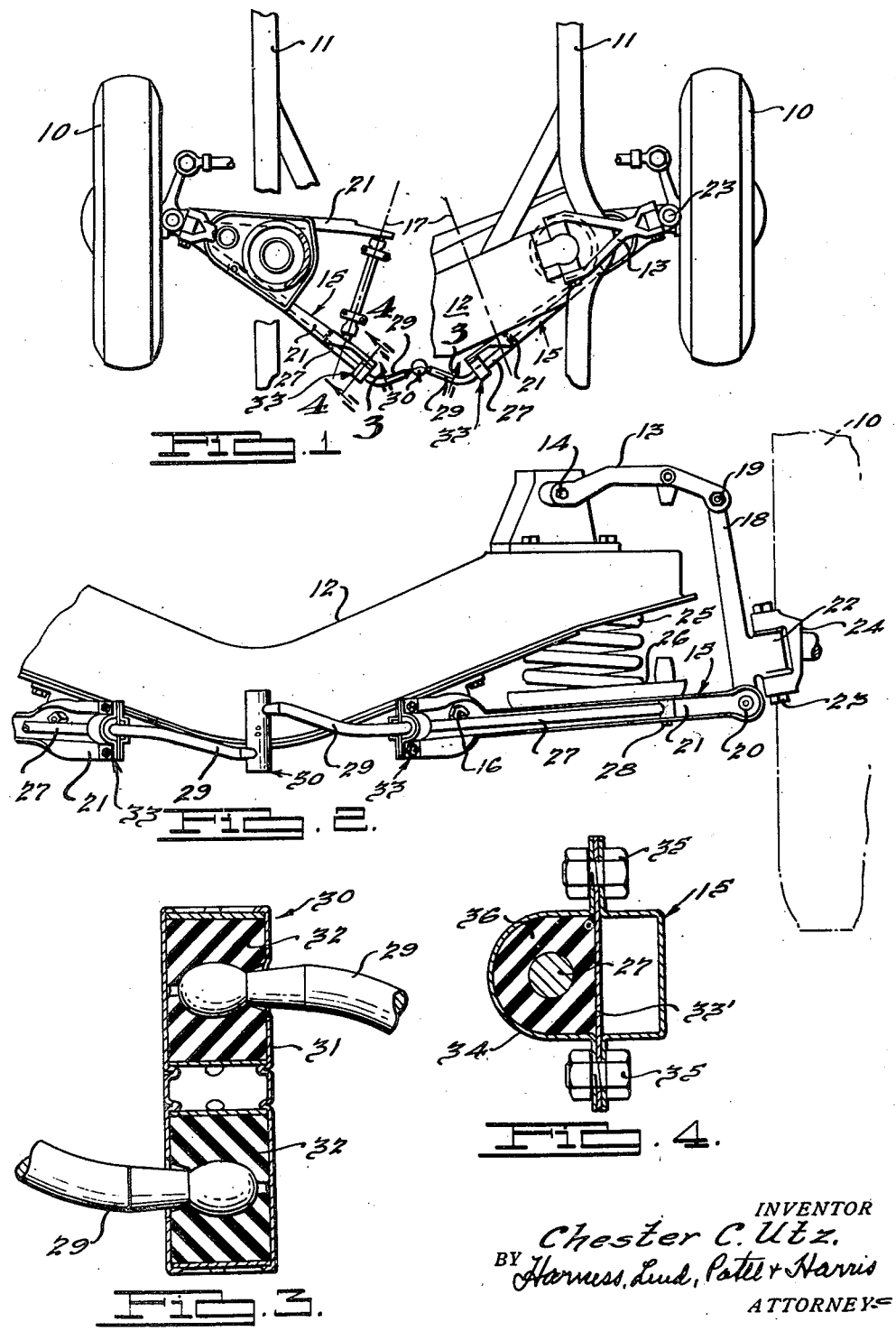
INVENTOR
Chester C. Utz.
BY Harness, Dind, Patel + Harris
ATTORNEYS Patented May 25, 1948

2,442,252

UNITED STATES PATENT OFFICE 2,442,252

MOTOR VEHICLE STABILIZING MEANS

Chester C. Utz, Magnolia, Mich., assignor to Chrysler Corporation, Highland Park, Mich., a corporation of Delaware

REISSUED
MAY 24 1949

Application September 17, 1942, Serial No. 458,625

11 Claims. (Cl. 267—11)

This invention relates to motor vehicles and more particularly to improvements in stabilizing or anti-sway means for the bodies of vehicles.

An object of the invention is to provide an efficient and low cost stabilizing means which is especially adapted for vehicles having independently sprung ground wheels.

Another object of the invention is the provision of stabilizing means as aforesaid which, when employed in association with steerable ground wheels, does not interfere with or restrict steering movement of such wheels and thus makes possible a shorter turning radius for the vehicle.

A still further object is the provision of stabilizing means in the form of a torsion bar structure in association with an independent wheel suspension having the foregoing advantages and which will readily accommodate the installation and removal of a lifting jack.

In carrying out the invention in conjunction with the independent wheel suspension including upper and lower link members connected at their outer ends by a wheel carrying structure, there is preferably provided a torsion bar for each suspension having the main body thereof disposed approximately parallel with and immediately adjacent the associated lower link member and non-rotatably connected at the outer end thereof to the latter member, the adjacent end portions of each of the bars constituting a crank arm angled from the main body. The free ends of these crank arms are connected together and cooperate with the fixed ends of the bars to torsionally stress the main body of the bars when, for example, one wheel rises or falls relative to the other thereof, thus developing torsion in both bars equally. Each bar is preferably rotatably connected by an insulating bushing with its associated link member at a point intermediate its crank arm and fixed end.

Other objects and advantages of the invention reside in the novel combination and arrangement of parts as will be more apparent from the following description taken in connection with the accompanying drawing, in which:

Fig. 1 is a top plan view of a portion of a typical motor vehicle construction having the invention applied thereto, parts being broken away to illustrate the underlying structure.

Fig. 2 is an enlarged front elevational view illustrating more particularly the application of the invention to a typical wheel suspension of Fig. 1.

Fig. 3 is a sectional elevational view taken on line 3—3 of Fig. 1.

Fig. 4 is a transverse section taken as indicated by the line 4—4 of Fig. 1.

Referring to the drawing, the invention is illustrated in connection with the front steerable ground wheels 10 disposed opposite each other at the sides of a frame structure, including the longitudinally extending side rails 11 and front cross member 12, which is adapted to support the body structure in the conventional manner.

The frame structure is supported on the wheels 10 by a system of independent suspension for each of the ground wheels, the illustrated suspension including the upper link member 13 pivoted at 14 on the frame structure and a lower link member 15 pivoted at 16 to the frame cross member 12 for swinging movement on the axis 17. The members 13 and 15 may be of the usual wishbone type and extend laterally outwardly and rearwardly of the vehicle for connection at their outer ends with the generally upright wheel carrying knuckle support arm 18 which is articulated at 19 and 20 with the upper and lower link members, respectively. The lower link member 15 includes a pair of arms 21 channel-shaped in cross section and opening away from each other.

The upright arm 18 carries a knuckle portion 22 having the usual king pin 23 for swivelling the companion knuckle portion 24 of the associated wheel 10 to thereby accommodate steering movement of the wheels in the well known manner. A coil spring 25 acts between the frame member 12 and a seat 26 supported by the lower link member to yieldingly support the weight of the frame structure on the ground wheels.

The independent wheel suspension accommodates rising and falling movement of each ground wheel 10 relative to the frame structure independently of the remaining ground wheels of the vehicle, the link members 13 and 15 maintaining the associated arm 18 in the desired upright position. Suitable shock absorbing means, not shown, may be associated with each wheel suspension, if desired.

The stabilizing means is provided by a torsion bar assembly including a pair of torsion bars 27 respectively associated with the illustrated wheel suspensions. Each bar 27 has the main body thereof disposed parallel with the forward member 21 of the associated lower linkage 15, the major portion of such main body lying within the associated channeled link member. The outer end of each bar 27 is T-shaped and hollow to receive a bolt 28 extending through the channel flanges of the member 21 and the spring seat 26, as more particularly shown in Fig. 2. In this manner the aforesaid bar end is non-rotatably secured to the lower linkage for movement therewith.

Thus it will be noted that the major portion of each torsion bar 26, and particularly that portion thereof extending outwardly beyond the pivot point 16 of the associated lower linkage is disposed generally lengthwise with respect to and immediately adjacent the forward member 21 of the latter linkage. This disposition of the bar eliminates engagement of the wheel tire with the associated rod during extreme steering turning movement of the wheel and thus presents no restriction with respect to turning of the vehicle. Furthermore, the clearing of the space adjacent the wheels by this disposition of the torsion bar facilitates the installation and removal of a lifting jack for raising a wheel and its support.

The inner end of each bar 27 is angled from the main body thereof, as more particularly shown in Fig. 1, to provide a relatively short lever arm 29. The free ends of the arms 29 are connected together by a link 30 including a metallic casing 31 having vertically spaced compartments each of which contains a body of rubber-like material 32 having oppositely disposed openings respectively registering with a corresponding opening in the casing 31 for detachably receiving the ball-like end of a crank arm 29.

Each torsion bar 27 is rotatably attached to its associated arm 21 intermediate its ends and adjacent its crank arm 29 by connection generally indicated at 33. For this connection the ends of the channel flanges of the arm 21 are oppositely deflected vertically and abut a plate 33' which overlies the channel portion of a bracket 34 having opposed flanges abutting the plate. The opposed flanges, plate 33' and the vertical flanges of the channel arm 21 have registering openings receiving the securing bolts 35. Within the channel portion of the bracket 34 is a body of rubber-like material 36 having an opening therein receiving the bar 27. The connection 33 provides an insulating journal for the bar 27, the material 36 being under compression.

In operation, rising or falling movement of one of the wheels 10 relative to the other thereof develops torsional resistance in both bars equally. In response to such relative wheel movement there is a transference of resistance in the torsion bar structure from bending at the crank arms to a torsional stress of the main body of each bar, it being noted that each bar has its outer end non-rotatably attached to its associated lower link member and journalled with respect thereto to accommodate torsional stress.

I claim:

1. In a vehicle including a pair of oppositely disposed wheels and independent suspension means for each wheel including a member oscillated with the associated wheel, torsion bars respectively associated with said members each having the main body thereof disposed approximately parallel to and immediately adjacent the associated member and having one end portion thereof fixedly anchored to said associated member for movement therewith, an insulating bushing rotatably connecting the main body of each of said bars with its associated member, the other end portion of each of said bars being angled from said main body thereof and connected one with the other, said connected ends cooperating with said fixed ends to torsionally stress each of said main bodies in response to relative oscillation of said members.

2. In a vehicle including a pair of oppositely disposed wheels and independent suspension means for each wheel including a member oscillated with the associated wheel, torsion bars respectively associated with said members each having a part thereof adapted to be torsionally stressed disposed lengthwise with respect to the associated member and having one end portion thereof fixedly anchored to said associated member for movement therewith, each of said bars having the other end portion thereof deflected from the axis of its said part to form a crank-like arm, an insulating bushing for each of said parts carried by the associated member, and a connection between the free ends of said crank-like arms, said crank-like arms cooperating with said fixed ends to torsionally stress each of said parts in response to relative oscillation of said members.

3. In a vehicle suspension including oppositely disposed wheels and means independently suspending said wheels for rising and falling movement, each suspension means including a member oscillated with the associated wheel and channel-shaped in cross section throughout the major portion of its length, stabilizing means including a torsion bar associated with each of said suspension means, each of said bars having the main body thereof disposed in the channel-shaped member of the associated suspension and having an end portion thereof secured to its member for movement therewith, the other end portion of each of said bars being angled from its said main body to form a crank-like arm, means connecting the free ends of said crank-like arms, and an insulating bushing rotatably connecting the main body of each of said arms with its associated member.

4. In a vehicle suspension including oppositely disposed wheels and means independently suspending said wheels for rising and falling movement, each suspension means including a member extending generally transversely of the vehicle and oscillated with the associated wheel, torsion bars respectively associated with said members each including a main body extending generally transversely of the vehicle and having its outer end portion anchored to its said member for movement therewith, the other end portion of each of said bars including a crank-like arm integral with and angled from the main body thereof, the free ends of said crank-like arms being spaced vertically, a connection between the free ends of said crank-like arms, said connected arms cooperating with said anchored ends to torsionally stress the main body of said bars in response to relative oscillation of said members, and connection between each associated member and torsion bar main body accommodating stressing of the latter as aforesaid.

5. In a vehicle suspension including oppositely disposed wheels and means independently suspending said wheels for rising and falling movement, each suspension means including a member oscillated with the associated wheel, vehicle stabilizing means including a torsion bar assembly having the outer end portions thereof respectively fixedly anchored to said members, journalling means for said bar assembly respectively carried by said members, said bar assembly including a pair of adjacent interconnected crank-like arms between said journalling means cooperating with said fixed end portions to torsionally stress those portions of said assembly intermediate said arms and said fixed end portions in response to movement of one of said wheels as aforesaid relative to the other of said wheels.

6. In a vehicle suspension including oppositely disposed wheels and means independently suspending said wheels for rising and falling movement, each suspension means including a member oscillated with the associated wheel, the main body of said member being channel-shaped in cross section, vehicle stabilizing means including a torsion bar assembly having spaced parts thereof respectively disposed in said main bodies of said members, the non-adjacent ends of each of said parts being non-rotatably attached to the associated member for movement therewith, journalling means for said bar assembly respectively carried by said members, said bar assembly including a pair of adjacent interconnected crank-like arms between said journalling means cooperating with said non-rotatably attached ends to torsionally stress those portions of said bar assembly intermediate said arms and said ends in response to movement of one of said wheels as aforesaid relative to the other of said wheels.

7. In a vehicle suspension including oppositely disposed wheels and means independently suspending said wheels for rising and falling movement, each suspension means including a member extending generally transversely of the vehicle and pivotally supported for oscillation with the associated wheel, torsion bars respectively associated with said members each having a part thereof extending outwardly with respect to the vehicle beyond the axis of pivot of its associated member, means non-rotatably fixing the outer end portion of each of said parts to its associated member for movement therewith, each of said bars having a crank arm at the other end portion thereof connected one with the other and operable in conjunction with said fixed outer end portions to torsionally stress that portion of each of said bars intermediate its crank arm and fixed end in response to movement of one of said wheels as aforesaid relative to the other of said wheels.

8. In a motor having a pair of oppositely disposed road wheels, a pair of members respectively connected with said wheels and mounted for oscillatory movement each about an individual axis, and stabilizing means including a pair of torsion bars respectively disposed generally transversely with respect to the axis of oscillation of said members and having their non-adjacent end portions respectively attached to said members for movement therewith, each of said bars having a crank-like arm at the adjacent end portion thereof spaced vertically one from the other, and yieldable force transmitting link means connecting said arms together for operation in conjunction with said non-adjacent ends to torsionally stress each of said bars intermediate said non-adjacent ends and said crank arms in response to relative oscillation of said members.

9. In a motor vehicle including a plurality of road wheels and a suspension for at least one of said wheels accommodating rising and falling movement thereof independently of other of said wheels, said suspension including a member mounted for oscillatory movement and connected with said one wheel for movement therewith in response to rising and falling thereof as aforesaid, and stabilizing means including a torsion bar having a part thereof disposed generally lengthwise with respect to said member adapted to be torsionally stressed to resist oscillatory movement of said member, an end portion of said part being non-rotatably connected to said member for movement therewith incident to rising and falling wheel movement, said bar further including a reaction crank-like arm at the other end portion thereof cooperating with said connection to stress said part as aforesaid.

10. In a vehicle including a pair of oppositely disposed road wheels, means supporting and guiding each of said wheels for rising and falling movement independently of each other, each of said means including an arm structure connected with its wheel for rising and falling movement therewith and mounted for oscillation to accommodate said movement, and stabilizing means including members relatively arranged to provide non-adjacent end portions respectively secured to said arm structures for movement therewith and adjacent end portions, each of said adjacent end portions including a crank arm offset one relative to the other, and force transmitting means connecting said crank arms together for cooperating with said non-adjacent end portions to torsionally stress said members intermediate said crank arms and said non-adjacent end portions in response to relative oscillation of said arm structures, said force transmitting connecting means being yieldable to accommodate limited relative movement of said crank arms under the influence of relative oscillation of said arm structures.

11. In a motor vehicle including a frame structure, a road wheel disposed at either side of said frame structure, means supporting and guiding each of said wheels from said frame structure for rising and falling movement independently of the other wheel, each of said means including upper and lower linkages extending generally outwardly from and pivotally connected to said frame structure for oscillatory movement relative thereto to accommodate said movement of the wheel associated therewith, the axes of pivot of said lower linkages being spaced one from the other in a direction transversely of said frame structure, spring means supporting said frame structure on said lower linkages, stabilizing means including a pair of spring elements respectively operably associated with said lower linkages and disposed generally transversely with respect to the axis of oscillatory movement of the associated lower linkage, each of said spring elements having end portions one of which is disposed outwardly with respect to the vehicle beyond the axis of oscillation of its associated lower linkage and the other of which is disposed between said axes, means for supporting each of said spring elements on its associated lower linkage and including means connecting each outwardly disposed end portion with its associated lower linkage for movement therewith and against movement relative thereto, each of said spring elements being free from connection with said frame structure other than through its said supporting means on the associated lower linkage, and means yieldingly connecting those end portions of said spring elements which are disposed between said axes so constructed and arranged as to accommodate relative movement therebetween and to transmit force between said spring elements in response to rising and falling movements of each wheel relative to the other to thereby yieldingly oppose such relative wheel movement by imposing upon each lower linkage a force tending to move the wheel supported thereby in a direction similar to said rising and falling movements of the other wheel.

CHESTER C. UTZ.

REFERENCES CITED

The following references are of record in the file of this patent:

UNITED STATES PATENTS

| Number | Name | Date |
| --- | --- | --- |
| 903,080 | Granieri | Nov. 3, 1908 |
| 1,314,015 | O'Connor | Aug. 26, 1919 |
| 1,959,265 | Zerk | May 15, 1934 |
| 2,043,542 | Johnson | June 9, 1936 |
| 2,083,381 | Hutchison | June 8, 1937 |
| 2,190,298 | Slack | Feb. 13, 1940 |
| 2,201,250 | Utz | May 21, 1940 |
| 2,220,916 | Schiff | Nov. 12, 1940 |
| 2,236,522 | Cook | Apr. 1, 1941 |
| 2,254,261 | Best | Sept. 2, 1941 |
| 2,344,072 | Winkelmann | Mar. 14, 1944 |